(12) United States Patent
Tsai

(10) Patent No.: US 6,302,539 B1
(45) Date of Patent: Oct. 16, 2001

(54) EYEGLASS FRAME

(76) Inventor: Ming-Hsiang Tsai, No. 29-6, Jen-Tung St., Tainan City (TW)

( * ) Notice: Subject to any disclaimer, the term of this patent is extended or adjusted under 35 U.S.C. 154(b) by 0 days.

(21) Appl. No.: 09/789,685

(22) Filed: Feb. 20, 2001

(51) Int. Cl.[7] .................................................. G02B 5/22
(52) U.S. Cl. ............................. 351/153; 351/116; 16/228
(58) Field of Search .................................. 351/103, 105, 351/106, 107, 108, 109, 110, 83, 86, 41, 116, 120, 140, 152, 153; 16/228

(56) References Cited

U.S. PATENT DOCUMENTS 5,426,473 * 6/1995 Tiehm .................................. 351/153

* cited by examiner

Primary Examiner—Hung Xuan Dang
(74) Attorney, Agent, or Firm—Rines and Rines

(57) ABSTRACT

An eyeglass frame includes a lens frame with two opposite end portions, each having a top wall formed with a bow retaining hole, a bottom wall formed with a bow mounting hole, and an insert slot defined by the top and bottom walls. The bow mounting hole has a first hole portion aligned with the bow retaining hole, a second hole portion offset from the bow retaining hole, and a restricted intermediate hole portion intercommunicating the first and second hole portions. Each of the bows has one end formed with a mounting shaft which has a retaining protrusion and a mounting protrusion opposite to the retaining protrusion. The mounting shaft is inserted into the insert slot and is rotatable within the insert slot from a disengaging position, in which the retaining protrusion and the mounting protrusion are disengaged from the bow retaining hole and the bow mounting hole, respectively, to an engaging position, in which the retaining protrusion and the mounting protrusion engage the bow retaining hole and the first hole portion of the bow mounting hole, respectively. The mounting protrusion moves past the second hole portion and the intermediate hole portion of the bow mounting hole when the mounting shaft rotates from the disengaging position to the engaging position.

6 Claims, 9 Drawing Sheets

EYEGLASS FRAME

BACKGROUND OF THE INVENTION

1. Field of the Invention

The present invention relates to an eyeglass frame, more particularly to an eyeglass frame which includes bows that can be easily assembled to a lens frame without the use of fasteners.

2. Description of the Related Art

A conventional eyeglass frame is typically composed of a lens frame and a pair of elongated bows which are hinged to opposite endpieces provided on the lens frame by means of fasteners, such as a pair of threaded pins. In assembly, the threaded pins are operated with the use of a tool, such as a screw driver. Since the threaded pins are relatively small in size, operation thereof is a labor-consuming task. Moreover, since the bows are frequently folded toward the lens frame and unfolded from the lens frame during use of the eyeglass, the threaded pins are susceptible to loosening from the endpieces to result in malfunctioning of the eyeglass.

SUMMARY OF THE INVENTION

Therefore, the main object of the present invention is to provide an eyeglass frame which includes bows that can be easily assembled to a lens frame without the use of fasteners.

Accordingly, the eyeglass frame of the present invention includes a lens frame and a pair of elongated bows. The lens frame has two opposite end portions, each of which is formed with horizontal top and bottom walls that are spaced-apart from each other so as to define an insert slot therebetween. One of the top and bottom walls is formed with a bow retaining hole communicated with the insert slot. The other one of the top and bottom walls is formed with a bow mounting hole communicated with the insert slot. The bow mounting hole includes a first hole portion aligned with the bow retaining hole along a vertical axis, a second hole portion offset from the bow retaining hole, and a restricted intermediate hole portion formed between and intercommunicating the first and second hole portions. The intermediate hole portion is narrower than the first and second hole portions. Each of the bows has a bow section adapted to be hung on the ear of a user, and a mounting shaft extending from one end of the bow section. The mounting shaft is formed with a retaining protrusion for engaging the bow retaining hole in a respective one of the opposite end portions of the lens frame, and a mounting protrusion opposite to the retaining protrusion for engaging the first hole portion of the bow mounting hole. The mounting shaft is inserted into the insert slot in a respective one of the opposite end portions of the lens frame, and is rotatable within the insert slot about an axis of the mounting shaft from a disengaging position to an engaging position. In the disengaging position, the retaining protrusion and the mounting protrusion are disengaged from the bow retaining hole and the bow mounting hole, respectively. In the engaging position, the retaining protrusion moves into and engages the bow retaining hole, the mounting protrusion moves into and engages the first hole portion of the bow mounting hole, and the respective one of the bows is pivotable about the vertical axis for folding toward and unfolding from the lens frame. The mounting protrusion on the mounting shaft passes through the second hole portion and the intermediate hole portion of the bow mounting hole when the mounting shaft rotates from the disengaging position to the engaging position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
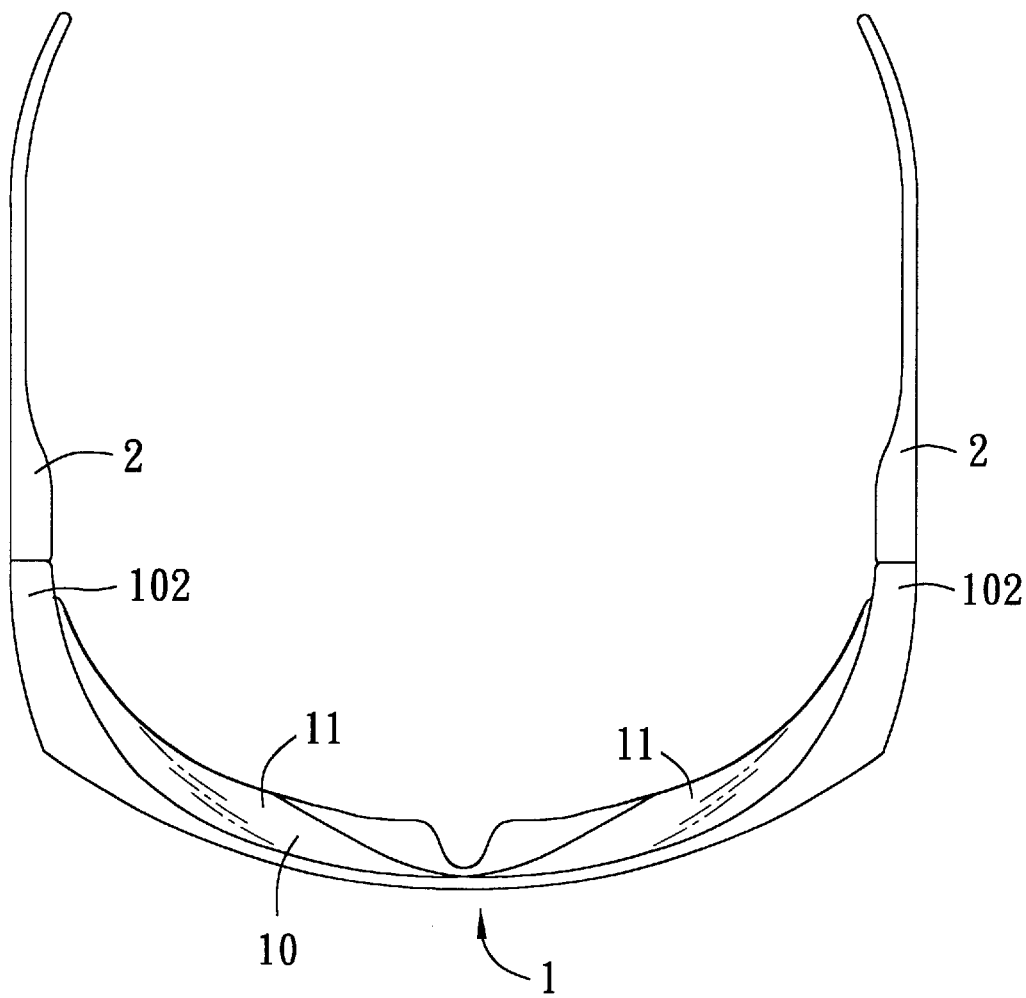
FIG. 1 is a top view of a first preferred embodiment of the eyeglass frame according to the present invention.

Before the present invention is described in greater detail, it should be noted that like elements are denoted by the same reference numerals throughout the disclosure.

Figure 2:
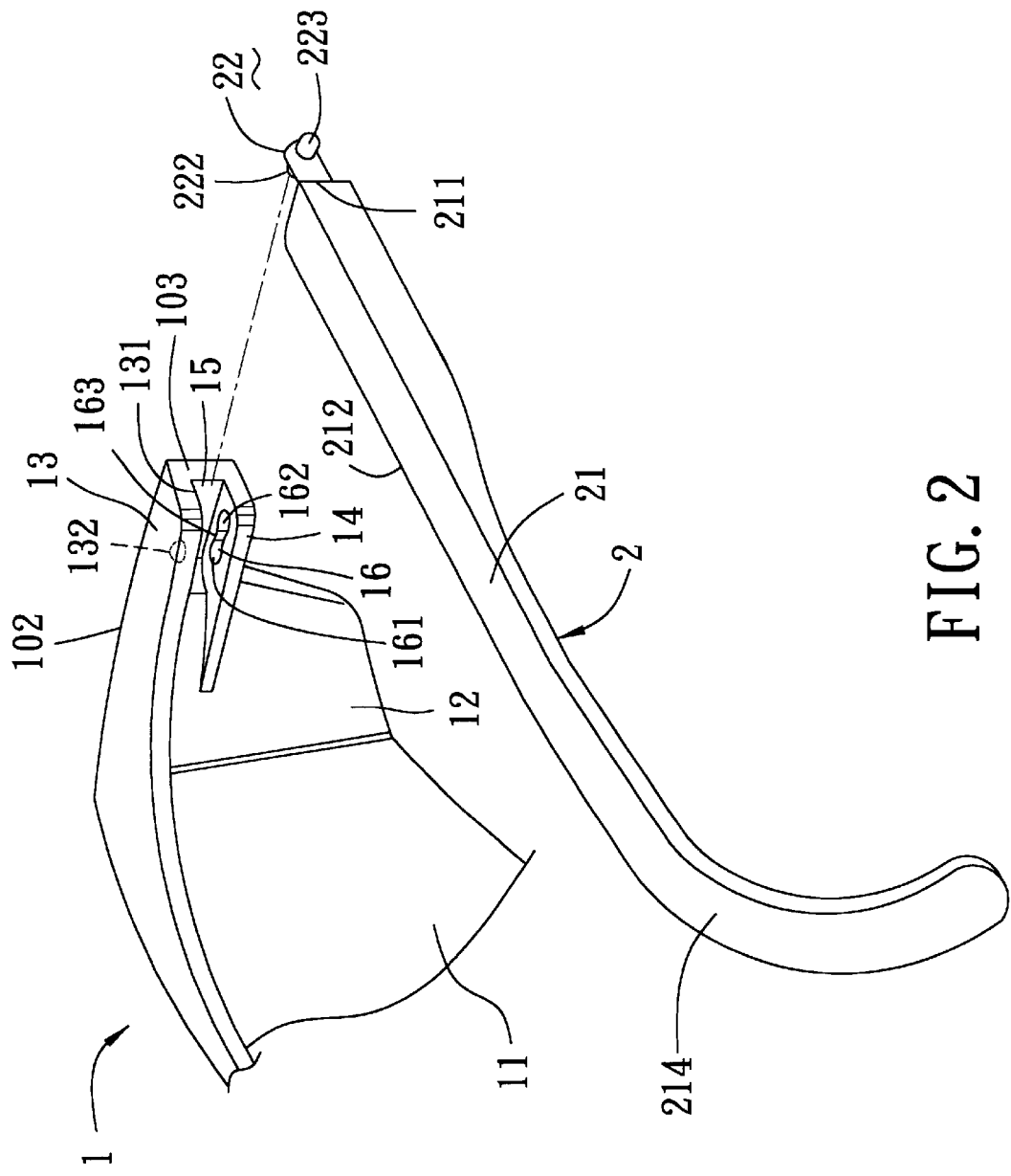
FIG. 2 is a fragmentary exploded perspective view of the first preferred embodiment.

Referring to FIGS. 1 and 2, the first preferred embodiment of the eyeglass frame of the present invention is shown to include a lens frame 1, a pair of elongated bows 2, and a lens piece 10. The lens frame 1 has two opposite end portions 102 which bend rearwardly, and a bottom edge connected integrally with the lens piece 10, which includes a pair of lens portions 11 and a pair of rearward-bending wing portions 12 that are connected respectively to opposite lateral edges of the lens portions 11 and to the opposite end portions 102 of the lens frame 1.

Each of the end portions 102 of the lens frame 1 has parallel top and bottom walls 13, 14 which are spaced-apart from each other so as to define an insert slot 15 therebetween, and a distal end face 103. The insert slot 15 has an access opening 131 which extends from the distal end face 103 to an inner side of the respective end portion 102 that faces another one of the end portions 102. The top wall 13 on each of the end portions 102 of the lens frame 1 has a bottom side formed with a round bow retaining hole 132 communicated with the insert slot 15. The bottom wall 14 on each of the end portions 102 of the lens frame 1 has a bow mounting hole 16 formed therethrough. The bow mounting hole 16 includes a round first hole portion 161 which is aligned with the bow retaining hole 132 along a vertical axis, a round second hole portion 162 offset from the bow retaining hole 132, and a restricted intermediate hole portion 163 formed between and intercommunicating the first and second hole portions 161, 162. The intermediate hole portion 163 is narrower than the first and second hole portions 161, 162. In this embodiment, the second hole portion 162 is proximate to the distal end face 103 of the respective end portion 102 of the lens frame 1 relative to the first hole portion 161.

Each of the bows 2 has a bow section 21 with a flat and curved end portion 214 adapted to be hung on an ear of the user. The bow section 21 has an abutment end face 211 opposite to the curved end portion 214. A cylindrical mounting shaft 22 projects from the abutment end face 211, and extends along an axis of the respective bow 2. The mounting shaft 22 is formed with a retaining protrusion 222 and a mounting protrusion 223 which are transverse to an axis of the mounting shaft 22 and which are opposite to and aligned with each other. The mounting protrusion 223 is longer than the retaining protrusion 222. Both the retaining protrusion 222 and the mounting protrusion 223 have circular cross-sections.

Figure 4:
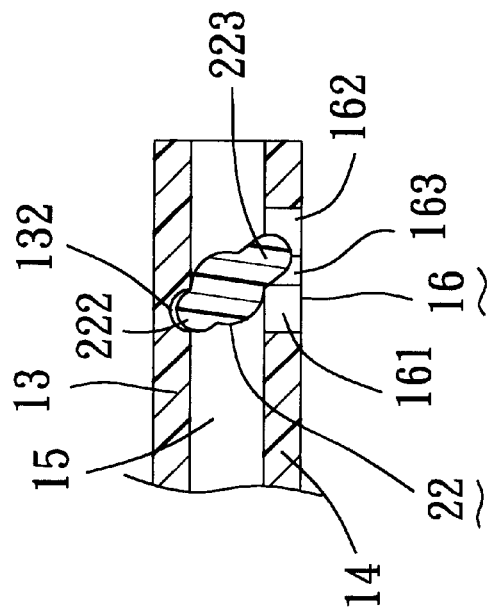
FIGS. 3 to 5 are fragmentary sectional views of the first preferred embodiment, illustrating how a bow is assembled to a lens frame of the eyeglass frame.
Figure 3:
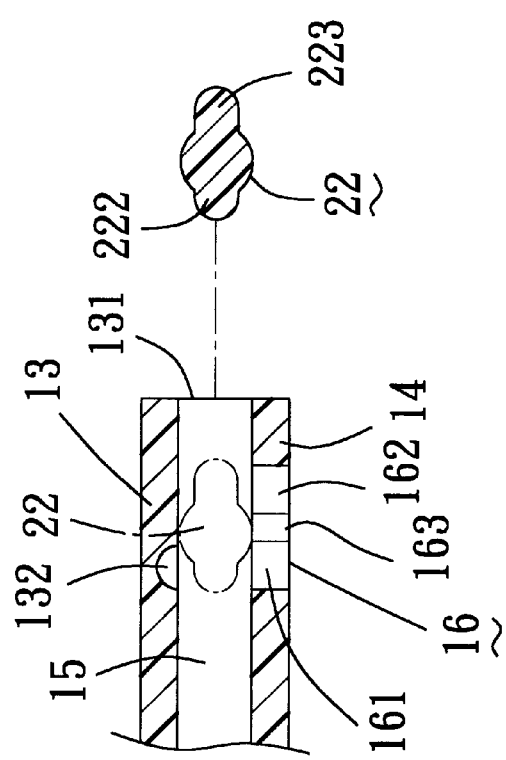
Figure 5:
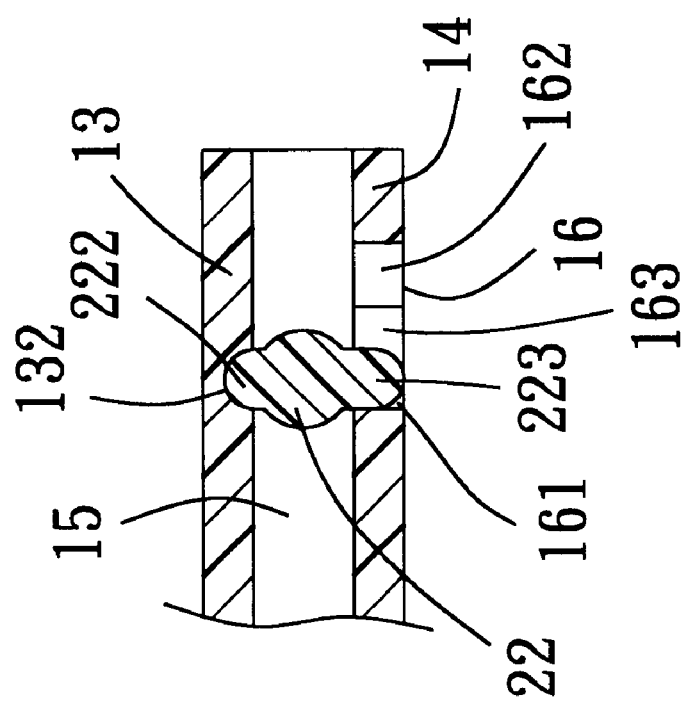
Figure 6:
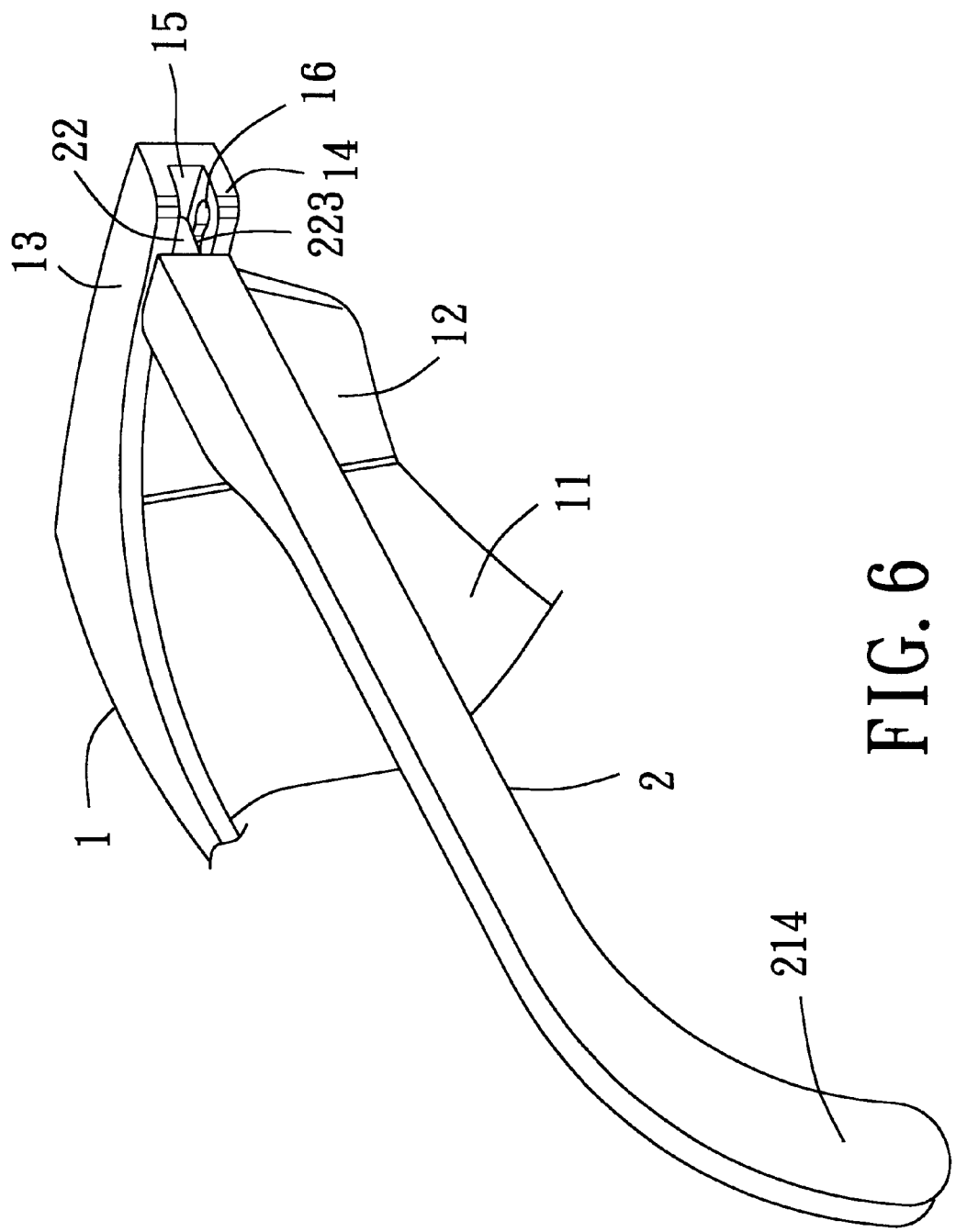
FIG. 6 is an assembled fragmentary perspective view of the first preferred embodiment.

To assemble the bows 2 to the lens frame 1, each of the bows 2 is initially disposed in an orientation in which the retaining protrusion 222 and the mounting protrusion 223 on the mounting shaft 22 and the curved end portion 214 of the bow section 21 are all disposed on a horizontal plane, in which the retaining protrusion 222 is oriented forwardly toward the insert slot 15, and in which the curved end portion 214 of the bow section 21 turns rearwardly. The mounting shaft 22 is then inserted into the insert slot 15 via the access opening 131, as shown in FIG. 3. The mounting shaft 22 is rotated about its axis within the insert slot 15 from a disengaging position shown in broken lines in FIG. 3 to an engaging position shown in FIG. 5. In the disengaging position, the retaining protrusion 222 and the mounting protrusion 223 are disengaged from the bow retaining hole 132 and the bow mounting hole 16, respectively. As shown in FIGS. 3 to 5, when the mounting shaft 22 rotates from the disengaging position to the engaging position, the retaining protrusion 222 is moved into the bow retaining hole 132 in the top wall 13 for engaging the bow retaining hole 132, and the mounting protrusion 223 is moved past the second hole portion 162 and the intermediate hole portion 163 and into the first hole portion 161 for engaging the first hole portion 161. After the mounting shaft 22 is disposed in the engaging position shown in FIG. 5, assembly of the bow 2 to the lens frame 1 is completed. At this time, the curved end portion 214 of the bow 2 turns downwardly and is disposed in an orientation suitable for hanging on the ear of the user. Simultaneously, the bow 2 is pivotable about the vertical axis that passes through the bow retaining hole 131 and the first hole portion 161 of the bow mounting hole 16 for folding upon and unfolding from the lens frame 1. When the bow 2 is unfolded from the lens frame 10, the abutment end face 211 abuts against the distal end face 103 on the respective end portion 102 of the lens frame 1.

Figure 7:
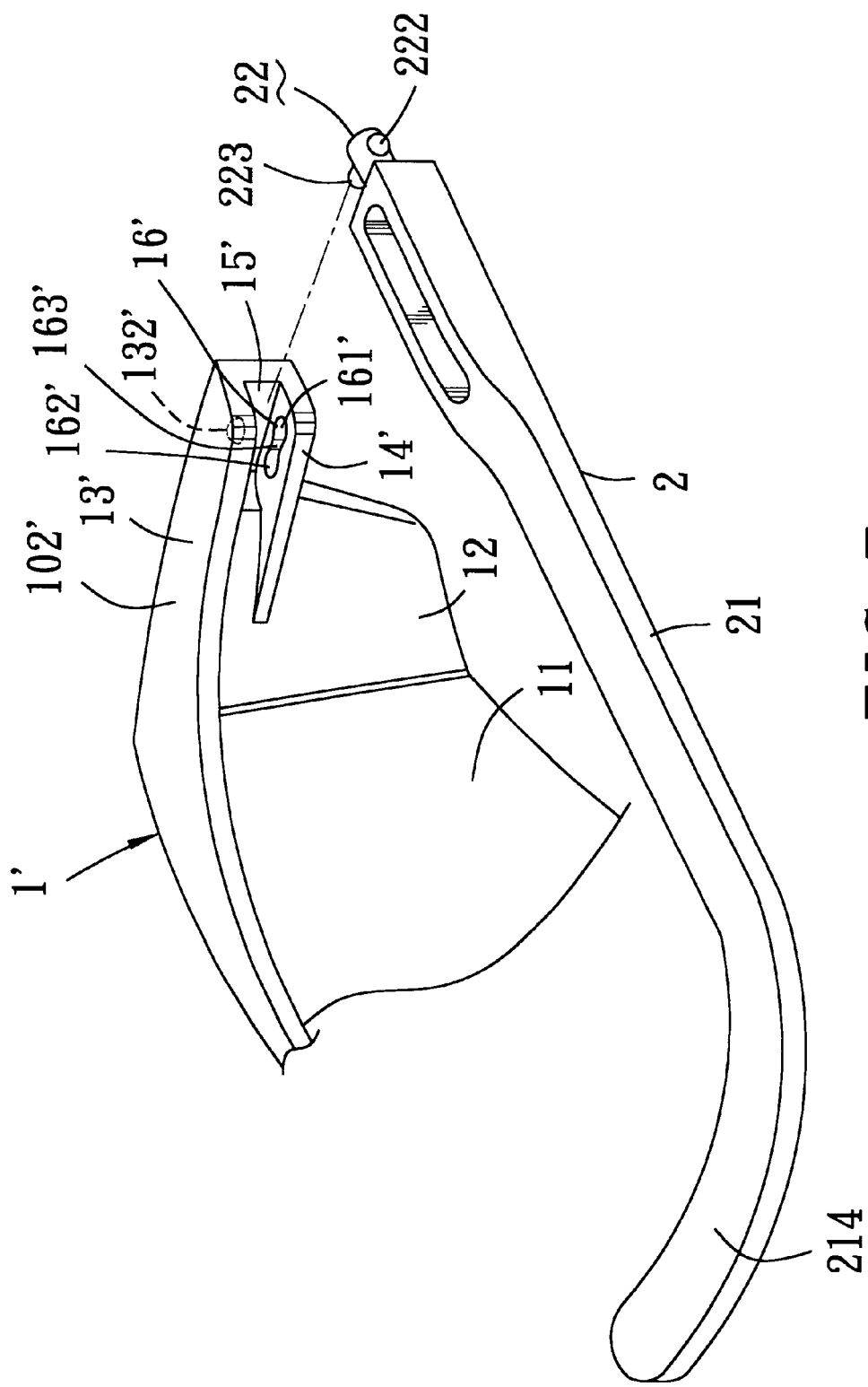
FIG. 7 is a fragmentary exploded perspective view of a second preferred embodiment of the eyeglass frame of the present invention.
Figure 8:
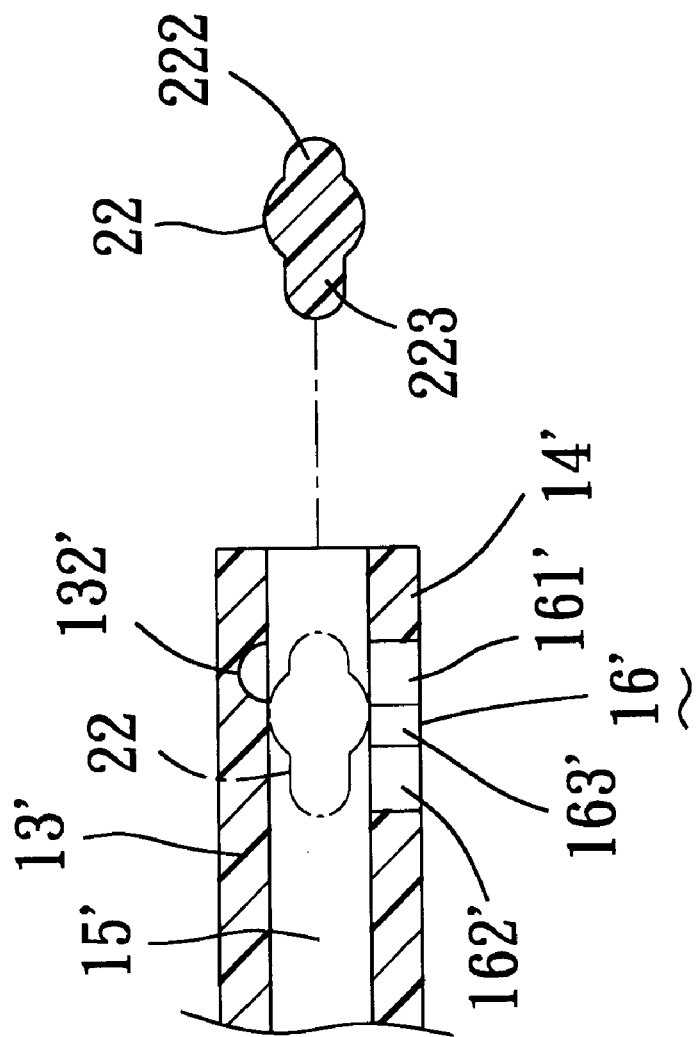
FIGS. 8 and 9 are fragmentary sectional views of the second preferred embodiment, illustrating how a bow is assembled to a lens frame of the eyeglass frame of the second preferred embodiment.
Figure 9:
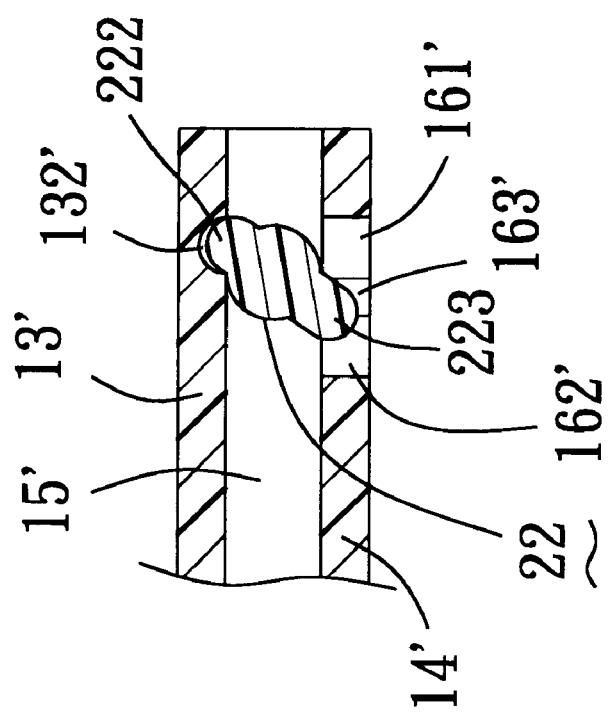
Figure 10:
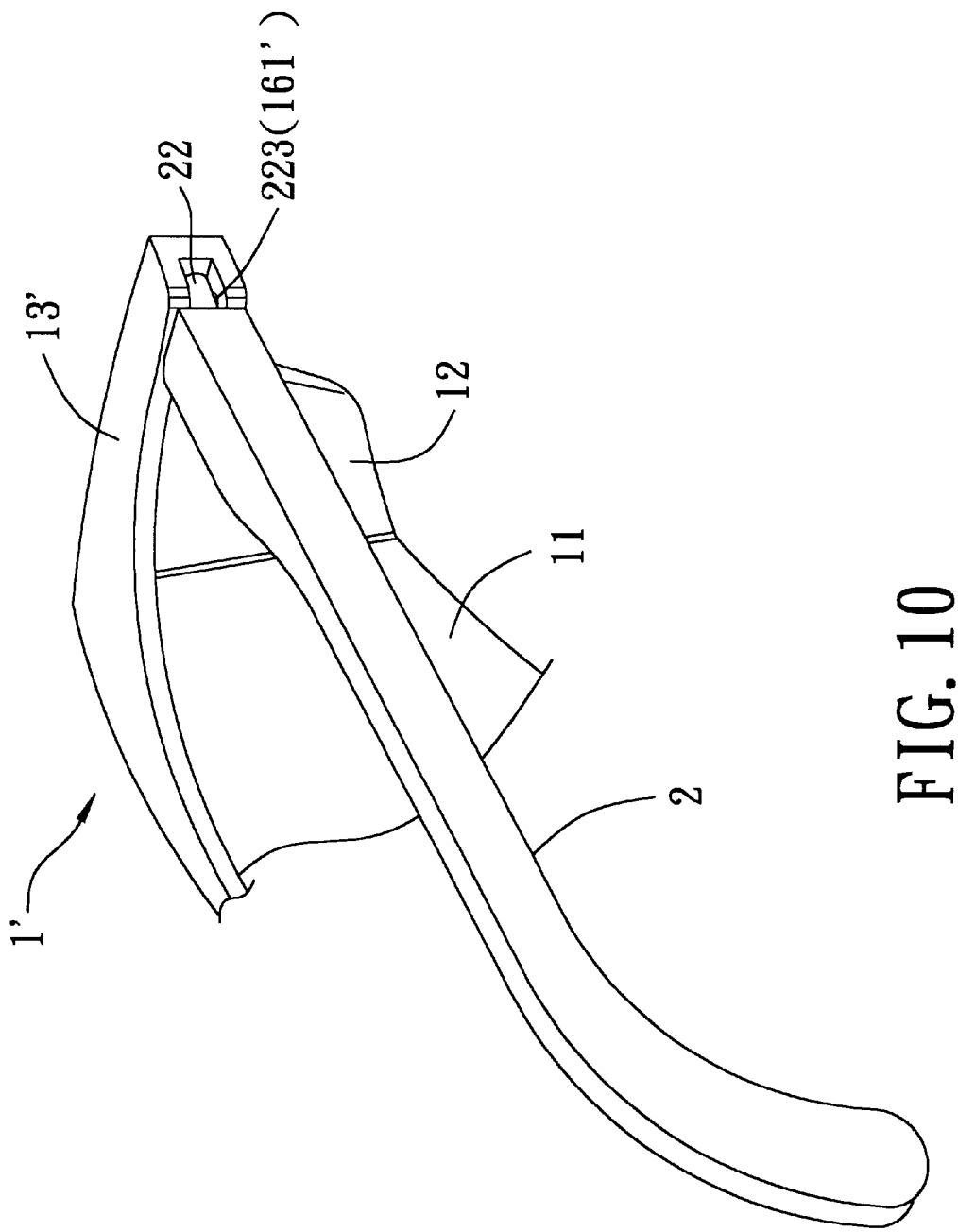
FIG. 10 is an assembled fragmentary perspective view of the second preferred embodiment.

Referring to FIG. 7, the second preferred embodiment of the eyeglass frame 1' of the present invention is shown to have a structure similar to that of the previous embodiment. In the second preferred embodiment, the first hole portion 161' of the bow mounting hole 16' in the bottom wall 14 of a respective one of the opposite end portion 102' of the lens frame 1' is proximate to the distal end face 103' of the respective end portions 102' relative to the second hole portion 162' of the bow mounting hole 16'. The bow retaining hole 132' in the top wall 13' is aligned with the first hole portion 161' of the bow mounting hole 16' along a vertical axis. When the mounting shaft 22 on a respective one of the bows 2 is to be inserted into the insert slot 15', the mounting protrusion 223 is oriented toward the insert slot 15' with the curved end portion 214 of the bow 2 turning forwardly. Then, by rotating the mounting shaft 22 after insertion into the insert slot 15', as shown in FIGS. 8 and 9, the mounting shaft 22 is movable from the disengaging position to the engaging position, as with the previous embodiment. Likewise, the mounting protrusion 223 moves past the second hole portion 162 and the intermediate hole portion 163' when the mounting shaft 22 rotates from the disengaging position to the engaging position. Referring to FIG. 10, after assembly, the bow 2 is pivotable about a vertical axis that passes through the bow retaining hole 132' and the first hole portion 161' of the bow mounting hole 16' for folding toward and unfolding from the lens frame 1'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An eyeglass frame comprising:

a lens frame having two opposite end portions, each of which is formed with horizontal top and bottom walls that are spaced-apart from each other so as to define an insert slot therebetween, one of said top and bottom walls being formed with a bow retaining hole communicated with said insert slot, the other one of said top and bottom walls being formed with a bow mounting hole communicated with said insert slot, said bow mounting hole including a first hole portion aligned with said bow retaining hole along a vertical axis, a second hole portion offset from said bow retaining hole, and a restricted intermediate hole portion formed between and intercommunicating said first and second hole portions, said intermediate hole portion being narrower than said first and second hole portions; and a pair of elongated bows, each of which has a bow section adapted to be hung on the ear of a user, and a mounting shaft extending from one end of said bow section, said mounting shaft being formed with a retaining protrusion for engaging said bow retaining hole in a respective one of said opposite end portions of said lens frame, and a mounting protrusion opposite to said retaining protrusion for engaging said first hole portion of said bow mounting hole, said mounting shaft being inserted into said insert slot in a respective one of said opposite end portions of said lens frame and being rotatable within said insert slot about axis of said mounting shaft from a disengaging position, in which said retaining protrusion and said mounting protrusion are disengaged from said bow retaining hole and said bow mounting hole, respectively, to an engaging position, in which said retaining protrusion moves into and engages said bow retaining hole and said mounting protrusion moves into and engages said first hole portion of said bow mounting hole, and in which the respective one of said bows is pivotable about said vertical axis for folding toward and unfolding from said lens frame, said mounting protrusion on said mounting shaft passing through said second hole portion and said intermediate hole portion of said bow mounting hole when said mounting shaft rotates from said disengaging position to said engaging position.

2. The eyeglass frame as claimed in claim 1, wherein said top wall on each of said opposite end portions of said lens frame has a bottom side formed with said bow retaining hole, said bottom wall on each of said opposite end portions of said lens frame being formed with said bow mounting hole.

3. The eyeglass frame as claimed in claim 1, wherein each of said opposite end portions of said lens frame has a distal end face formed with an opening for access to said insert slot, said bow section of each of said elongated bows having an abutment end face from which said mounting shaft projects, said abutment end face of each of said bows abutting against said distal end face on a respective one of said opposite end portions of said lens frame when the respective one of said bows is unfolded from said lens frame.

4. The eyeglass frame as claimed in claim 3, wherein said end portions bend rearward and said distal end faces on said end portions face rearward.

5. The eyeglass frame as claimed in claim 4, wherein said second hole portion of said bow mounting hole is proximate to said distal end face on the respective one of said opposite end portions of said lens frame relative to said first hole portion.

6. The eyeglass frame as claimed in claim 4, wherein said first hole portion of said bow mounting hole is proximate to said distal end face on the respective one of said opposite end portions of said lens frame relative to said second hole portion.

* * * * *